(12) United States Patent
Hoykinpuro

(10) Patent No.: US 12,634,775 B2
(45) Date of Patent: May 19, 2026

(54) CONTROLLING COMMUNICATIONS NETWORK

(71) Applicant: Elisa Oyj, Helsinki (FI)

(72) Inventor: Veijo Hoykinpuro, Helsinki (FI)

(73) Assignee: Elisa Oyj, Helsinki (FI)

( * ) Notice: Subject to any disclaimer, the term of this patent is extended or adjusted under 35 U.S.C. 154(b) by 323 days.

(21) Appl. No.: 18/558,373

(22) PCT Filed: Apr. 11, 2022

(86) PCT No.: PCT/FI2022/050232
§ 371 (c)(1),
(2) Date: Nov. 1, 2023

(87) PCT Pub. No.: WO2022/234179
PCT Pub. Date: Nov. 10, 2022

(65) Prior Publication Data
US 2024/0224138 A1 Jul. 4, 2024

(30) Foreign Application Priority Data
May 3, 2021 (FI) ..................................... 20215512

(51) Int. Cl.
*H04W 36/00* (2009.01)
*H04L 41/0823* (2022.01)
(Continued)

(52) U.S. Cl.
CPC ..... *H04W 36/0079* (2018.08); *H04L 41/0836* (2013.01); *H04L 43/0847* (2013.01);
(Continued)

(58) Field of Classification Search
CPC ............. H04W 36/0079; H04W 76/19; H04W 36/00835; H04W 24/02; H04W 24/08;
(Continued)

(56) References Cited

U.S. PATENT DOCUMENTS 9,699,717 B2 7/2017 Wellington
2013/0337794 A1 12/2013 Kojima
(Continued)

FOREIGN PATENT DOCUMENTS

EP 3598789 A1 1/2020
KR 101890156 B1 9/2018
(Continued)

OTHER PUBLICATIONS

Wang et al., Neighbor Cell List Optimization in Handover Management Using Cascading Bandits Algorithm, IEEE Access, vol. 8, 2020, p. 134137-134150, Total 14 Pages, Jul. 21, 2020 (Year: 2020).*

*Primary Examiner* — Michael A Keller
*Assistant Examiner* — Chhian (Amy) Ling
(74) *Attorney, Agent, or Firm* — Espatent Oy

(57) ABSTRACT

A computer implemented method for controlling a communications network. It is checked whether amount of handover failures from a first cell to a second cell exceeds a first threshold. Responsive to identifying that the amount of handover failures from the first cell to the second cell exceeds (301) the first threshold, a new cell identifier code is set (306) for the second cell in the communication network.

14 Claims, 3 Drawing Sheets

(51) Int. Cl.
  *H04L 43/0823*    (2022.01)
  *H04W 24/02*    (2009.01)
  *H04W 24/08*    (2009.01)
  *H04W 76/19*    (2018.01)

(52) U.S. Cl.
  CPC ........... *H04W 24/02* (2013.01); *H04W 24/08*
    (2013.01); *H04W 36/0058* (2018.08); *H04W*
    *76/19* (2018.02); *H04W 36/00835* (2018.08)

(58) Field of Classification Search
  CPC ........... H04W 36/0058; H04L 43/0847; H04L
    41/0836
  See application file for complete search history.

(56) References Cited

U.S. PATENT DOCUMENTS

2014/0018073 A1 * 1/2014 Frenger ................. H04W 24/02
                                                       455/434

| | | | |
|---|---|---|---|
| 2014/0120895 A1 * | 5/2014 | Moe ...................... H04W 24/02 |
| | | | 455/418 |
| 2015/0079990 A1 | 3/2015 | Yun et al. |
| 2016/0205595 A1 * | 7/2016 | Stewart .......... H04W 36/00837 |
| | | | 455/436 |
| 2017/0070896 A1 | 3/2017 | Shindo |
| 2018/0063757 A1 | 3/2018 | Gormley et al. |
| 2019/0281514 A1 * | 9/2019 | Krishnan .............. H04W 24/02 |
| 2020/0213918 A1 * | 7/2020 | Krishnan ................ H04W 8/08 |
| 2021/0377831 A1 * | 12/2021 | Yan ................. H04W 36/00838 |

FOREIGN PATENT DOCUMENTS

| | | | |
|---|---|---|---|
| WO | 2009022974 A1 | 2/2009 |
| WO | 2014180599 A1 | 11/2014 |
| WO | 2015038230 A1 | 3/2015 |
| WO | 2015157905 A1 | 10/2015 |
| WO | 2016154604 A1 | 9/2016 |

* cited by examiner

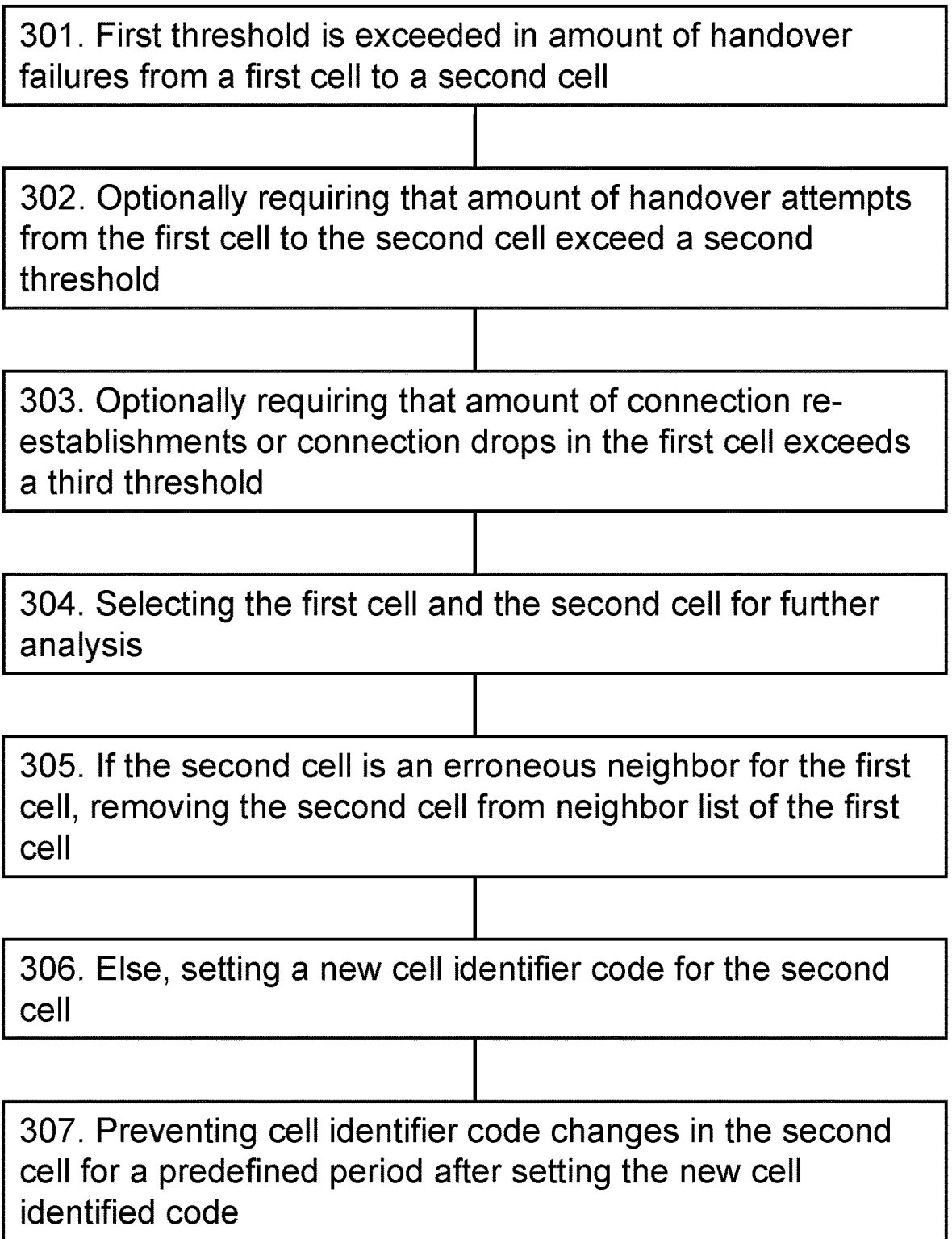

301. First threshold is exceeded in amount of handover failures from a first cell to a second cell 302. Optionally requiring that amount of handover attempts from the first cell to the second cell exceed a second threshold 303. Optionally requiring that amount of connection re-establishments or connection drops in the first cell exceeds a third threshold 304. Selecting the first cell and the second cell for further analysis 305. If the second cell is an erroneous neighbor for the first cell, removing the second cell from neighbor list of the first cell 306. Else, setting a new cell identifier code for the second cell 307. Preventing cell identifier code changes in the second cell for a predefined period after setting the new cell identified code

Fig. 3

Cell 15
Code 128

Cell 14
Code 259

Cell 16
Code 208

UE 401

Cell 13
Code 186

Cell 11
Code 340

Cell 12
Code 294

Cell 2
Code 75

Cell 1
Code 132

Cell 3
Code 87

Cell 9
Code 157

Cell 7
Code 198

Cell 8
Code 163

Cell 6
Code 208

Cell 5
Code 55

CONTROLLING COMMUNICATIONS NETWORK

TECHNICAL FIELD

The present application generally relates to controlling a communications network.

BACKGROUND

This section illustrates useful background information without admission of any technique described herein representative of the state of the art.

Cellular communications networks comprise a plurality of cells serving users of the network. There are various factors that affect operation of individual cells and co-operation between the cells. In order for the communications network to operate as intended and to provide planned quality of service, cells of the communications network need to operate as planned.

Now a new approach is taken to controlling a communications network.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for controlling a communications network. In an example case, the method is implemented by checking whether amount of handover failures from a first cell to a second cell exceeds a first threshold, and responsive to identifying that the amount of handover failures from the first cell to the second cell exceeds the first threshold, setting a new cell identifier code for the second cell in the communications network.

In some example embodiments, the method further comprises responsive to identifying that the amount of handover failures from the first cell to the second cell exceeds (301) the first threshold, selecting (304) the pair of the first cell and the second cell for analysis, checking whether the second cell is an erroneous neighbor for the first cell, responsive to finding that the second cell is an erroneous neighbor for the first cell, removing the second cell from a neighbor list of the first cell, if the second cell exists in the neighbor list, and else, setting the new cell identifier code for the second cell in the communications network.

In some example embodiments, the first threshold is defined as a percentage of failures over total number of handover attempts from the first cell to the second cell. The percentage may be for example 1-50% or 10-30%. As a further example, the first threshold may be 10%, 15%, 20%, 25% or 30%.

In some example embodiments, the first threshold is defined as an absolute number of handover failures from the first cell to the second cell. The absolute number may be for example 40-80 failures in 4 days or 7-20 failures per day. As a further example, the first threshold may be 45, 50, 55 or 60 failures in 4 days, or 7, 10 or 15 failures per day.

In some example embodiments, the first threshold is defined as a combination of a percentage of failures over the total number of handover attempts from the first cell to the second cell and the absolute number of handover failures.

In some example embodiments, exceeding the first threshold further requires that amount of handovers attempts from the first cell to the second cell exceeds a second threshold. The second threshold may be for example 40-80 handover attempts in 4 days or 7-20 handover attempts per day. As a further example, the second threshold may be 45, 50, 55 or 60 failures in 4 days, or 7, 10 or 15 failures per day.

In some example embodiments, exceeding the first threshold further requires that the first threshold is exceeded at least in two to four consecutive days.

In some example embodiments, exceeding the first threshold further requires that amount of connection re-establishments and/or amount of connection drops in the first cell exceeds a third threshold. The third threshold may be for example 2-10.

In some example embodiments, the cell identifier code is Scrambling Code, SC, of 3G; or Physical Cell Identifier, PCI, of 4G or 5G.

In some example embodiments, finding that the second cell is an erroneous neighbor for the first cell requires that number of same frequency cells that use the same frequency with the second cell between the first cell and the second cell exceeds a fourth threshold. The fourth threshold may be for example 60-90% of the number of available unique cell identifiers. As a further example, the fourth threshold may be 80%. As an absolute value, the fourth threshold may be for example 300-1000.

In some example embodiments, the new cell identifier code for the second cell is selected from codes that have largest reuse distance and are not used by same frequency neighbors of the first cell or same frequency neighbors' neighbors of the first cell.

In some example embodiments, cell identifier code changes of the second cell are prevented for a predefined period of time after setting the new cell identifier code for the second cell. The predefined time period may be for example 14-90 days. As a further example, the predefined time period may be 50 days.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3 shows a flow diagram illustrating example methods according to certain embodiments.

DETAILED DESCRIPTION

Example embodiments of the present invention and its potential advantages are understood by referring to FIGS. 1 through 4 of the drawings. In the following description, like reference signs denote like elements or steps.

Cells of a communication network are allocated a cell identifier code. In 3G networks, the cell identifier code is Scrambling Code, SC, and in 4G or 5G networks, the cell identifier code is Physical Cell Identifier, PCI. The number of unique cell identifier codes is limited and therefore each cell cannot be allocated their own code. Instead, the codes need to be reused. For example in 4G LTE there are 504 PCIs, in 5G NR there are 1008 PCIs, and in 3G there are 512 SCs.

Since the cell identifier codes are reused, the allocation of the cell identifier codes is an important network design parameter. Non-optimal allocation of the cell identifier codes may cause problems. Problems may occur for example, if a first cell has a defined neighbor with certain frequency-cell identifier code pair, but at the same time sufficiently strong signals may be received also from a different cell that uses the same frequency-cell identifier code pair. In such case, the first cell may attempt to handover connections to the cell in the neighbor list based on the signals received from the different cell, and such handover is likely to fail as the handover decision is not based on signals received from the cell in the neighbor list. The problems with the cell identifier codes may occur for example in areas where there are many cells close to each other, so that it is not possible to allocate unique code to all cells in the area; where the same cell identifier codes are allocated to cells that are too close to each other; where there are plenty of waterways that may cause that cells are serving unpredictably far; that are near state border and signals from frequency-cell identifier code pair of other country's network reach the area.

Example embodiments of the invention provide new methods for controlling communication networks by adjusting cell identifier codes of cells of the communication network based on analysis of handover failures.

Figure 1:
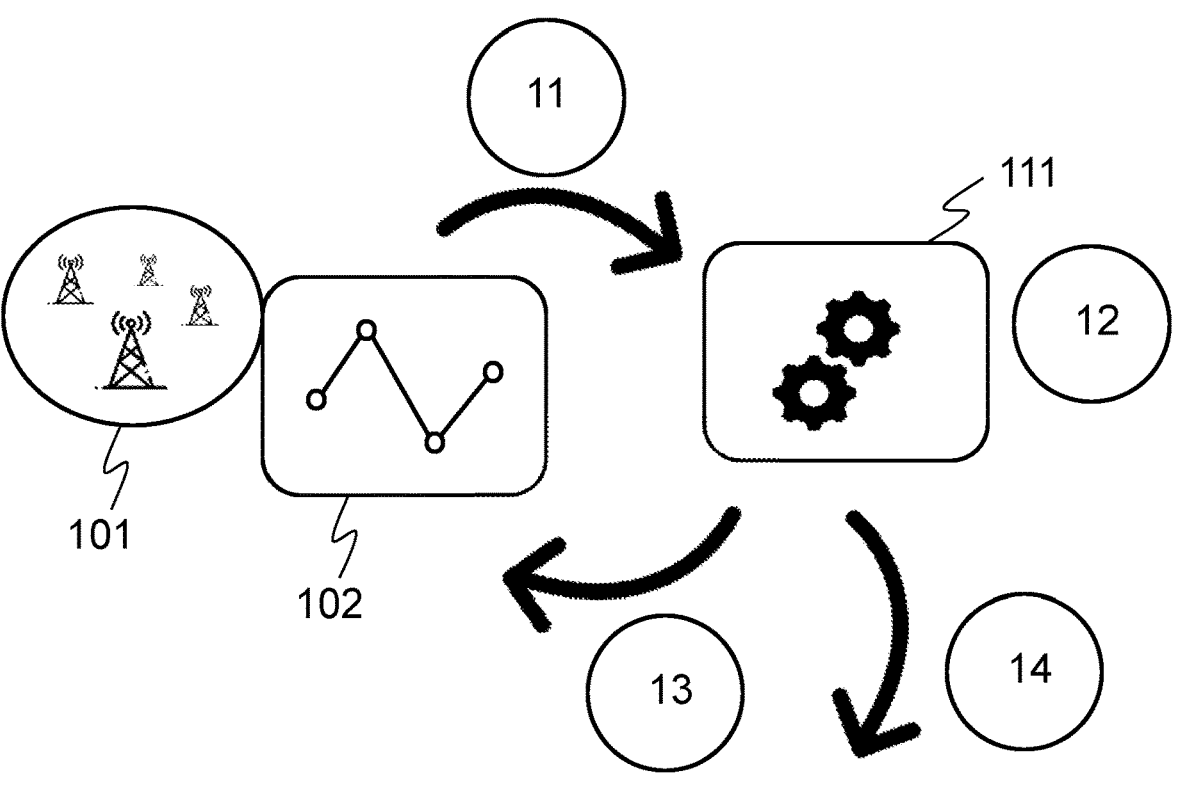
FIG. 1 schematically shows an example scenario according to an example embodiment.

FIG. 1 schematically shows an example scenario according to an embodiment. The scenario shows a communications network 101 comprising a plurality of cells and base stations and other network devices, and an operations support system, OSS, 102 configured to manage operations of the communications network 101. Further, the scenario shows an automation system 111. The automation system 111 is configured to implement automated controlling of operation of the communications network 101. The automation system 111 is operable to interact with the OSS 102 for example to receive performance data from the OSS 102.

The automation system 111 is configured to implement at least some example embodiments of present disclosure.

In an example embodiment, the scenario of FIG. 1 operates as follows: In phase 11, the automation system 111 obtains at least handover data from the OSS 102. Also some other data may be obtained from the OSS or from other sources.

In phase 12, the handover data is automatically analysed in the automation system 111 to identify whether there is a need to adjust cell identifier codes in the communications network 101.

In phase 13, changes in the communications network are automatically performed based on the results of the analysis. For example, cell identifier codes and/or neighbor lists may be adjusted.

In phase 14, the results of the analysis may be optionally output for further processing. The results of the analysis may be shown on a display or otherwise output to a user.

The analysis may be automatically or manually triggered. The analysis may be periodically repeated.

Figure 2:
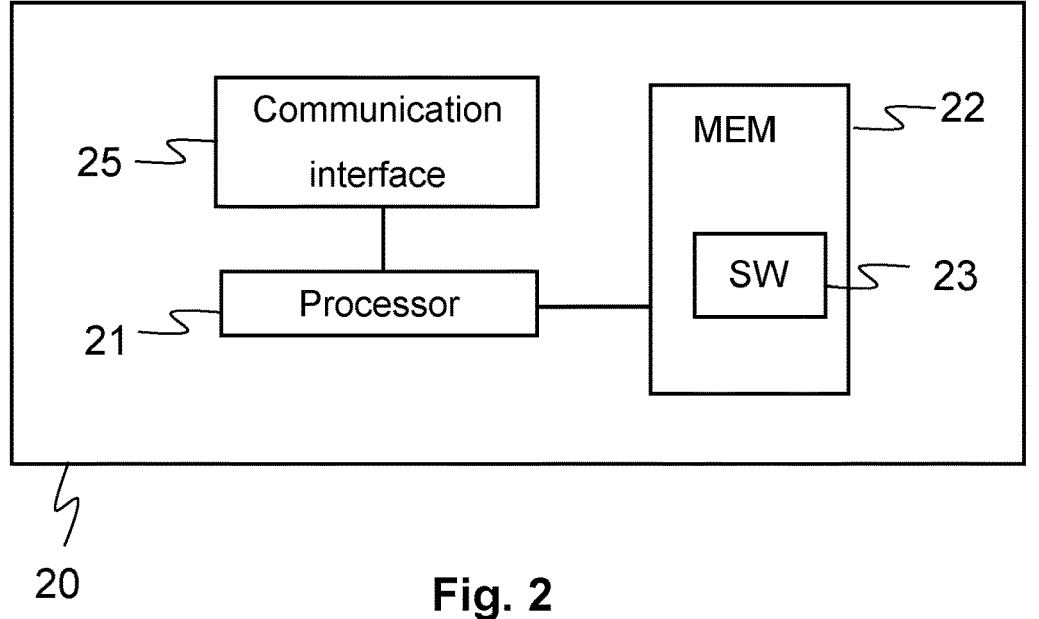
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus. The apparatus 20 can be used for implementing at least some embodiments of the invention. That is, with suitable configuration the apparatus 20 is suited for operating for example as the automation system 111 of foregoing disclosure.

The apparatus 20 comprises a communication interface 25; a processor 21; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

Further, there may be a user interface configured for providing interaction with a user of the apparatus. Additionally or alternatively, the user interaction may be implemented through the communication interface 25. The user interface may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the invention may equally be implemented in a cluster of shown apparatuses.

FIG. 3 shows a flow diagram illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. The shown method comprises various possible process phases including some optional phases while also further phases can be included and/or some of the phases can be performed more than once.

The method of FIG. 3 comprises the following phases:

301: It is identified that amount of handover failures from a first cell to a second cell exceeds a first threshold.

The first threshold may be defined as a percentage of failures over total number of handover attempts from the first cell to the second cell. The percentage may be for example 1-50% or 10-30%. As a further example, the first threshold may be 10%, 15%, 20%, 25% or 30%. Additionally or alternatively, the first threshold may be defined as an absolute number of handover failures from the first cell to the second cell. The absolute number may be for example 40-80 failures in 4 days or 7-20 failures per day. As a further example, the first threshold may be 45, 50, 55 or 60 failures in 4 days, or 7, 10 or 15 failures per day.

In some examples, the first threshold is defined as a combination of the percentage and the absolute number, that is, as a combination of the percentage of failures over total number of handover attempts from the first cell to the second cell and the absolute number of handover failures from the first cell to the second cell. By such combination, changes that are made based on rare and/or temporary problems can be avoided or at least reduced.

Further, exceeding the first threshold may further require that the first threshold is exceeded in predefined number of consecutive days. It may be required that the threshold is exceeded for example in two to four consecutive days. In this way, changes that are made based on rare and/or temporary problems can be avoided or at least reduced.

302: Optionally, exceeding the first threshold further may require that amount of handovers attempts from the first cell to the second cell exceeds a second threshold. The second threshold may be for example 40-80 handover attempts in 4 days or 7-20 handover attempts per day. As a further example, the second threshold may be 45, 50, 55 or 60 failures in 4 days, or 7, 10 or 15 failures per day. In this way, changes that are made based on isolated and/or rare problems can be avoided or at least reduced.

303: Optionally, exceeding the first threshold further may require that amount of connection re-establishments and/or amount of connection drops in the first cell exceeds a third threshold. The third threshold may be for example 2-10. In this way, it is ensured that there is really a problem or deteriorated service experienced in the first cell before making changes in the network.

304: Responsive to identifying that the first threshold is exceeded (phase 301 optionally in combination with phase 302 and/or 303), the pair of the first and the second cell is selected for further analysis.

305: It is checked whether the second cell is an erroneous neighbor for the first cell. If the second cell is found out to be an erroneous neighbor, the second cell is removed from the neighbor list of the first cell, if the second cell exists in the neighbor list.

In some example embodiments, finding that the second cell is an erroneous neighbor for the first cell requires that number of same frequency cells that use the same frequency with the second cell between the first cell and the second cell exceeds a fourth threshold. The fourth threshold may be for example 60-90% of the number of available unique cell identifiers. As a further example, the fourth threshold may be 80%. As an absolute value, the fourth threshold may be for example 300-1000.

In some example embodiments, the new cell identifier code for the second cell is selected from codes that have largest reuse distance and that are not used by same frequency neighbors of the first cell or same frequency neighbors' neighbors of the first cell.

With regard to 3G network, it is noted that handover may be attempted to a cell that is not listed in a neighbor list (soft handover). In such case, it is not possible to remove the erroneous neighbor from the neighbor list. Therefore, the process may stop without taking any actions in such case.

306: Else, a new cell identifier code is set for the second cell in the communication network. Setting a new code refers to changing the cell identifier code to a different value.

In an example embodiment, the phases 304 and 305 are skipped. That is, neighbor list analysis is not performed. Instead, the process proceeds to setting the new cell identifier code for the second cell, if it is identified in phase 301 (optionally in combination with phases 302 and 303) that the amount of handover failures from the first cell to the second cell exceeds the first threshold.

307: Cell identifier code changes of the second cell are prevented for a predefined period of time after setting the new cell identifier code for the second cell. The predefined period of time may be for example 14-90 days. As a further example, the predefined time period may be 50 days. In this way, continuous changes are avoided or at least reduced. That is, changes in the cell identifier codes are not performed repeatedly. Every change in the network may cause short service break and therefore it is important to make only the right changes and avoid changing parameters back and forth.

Figure 4:
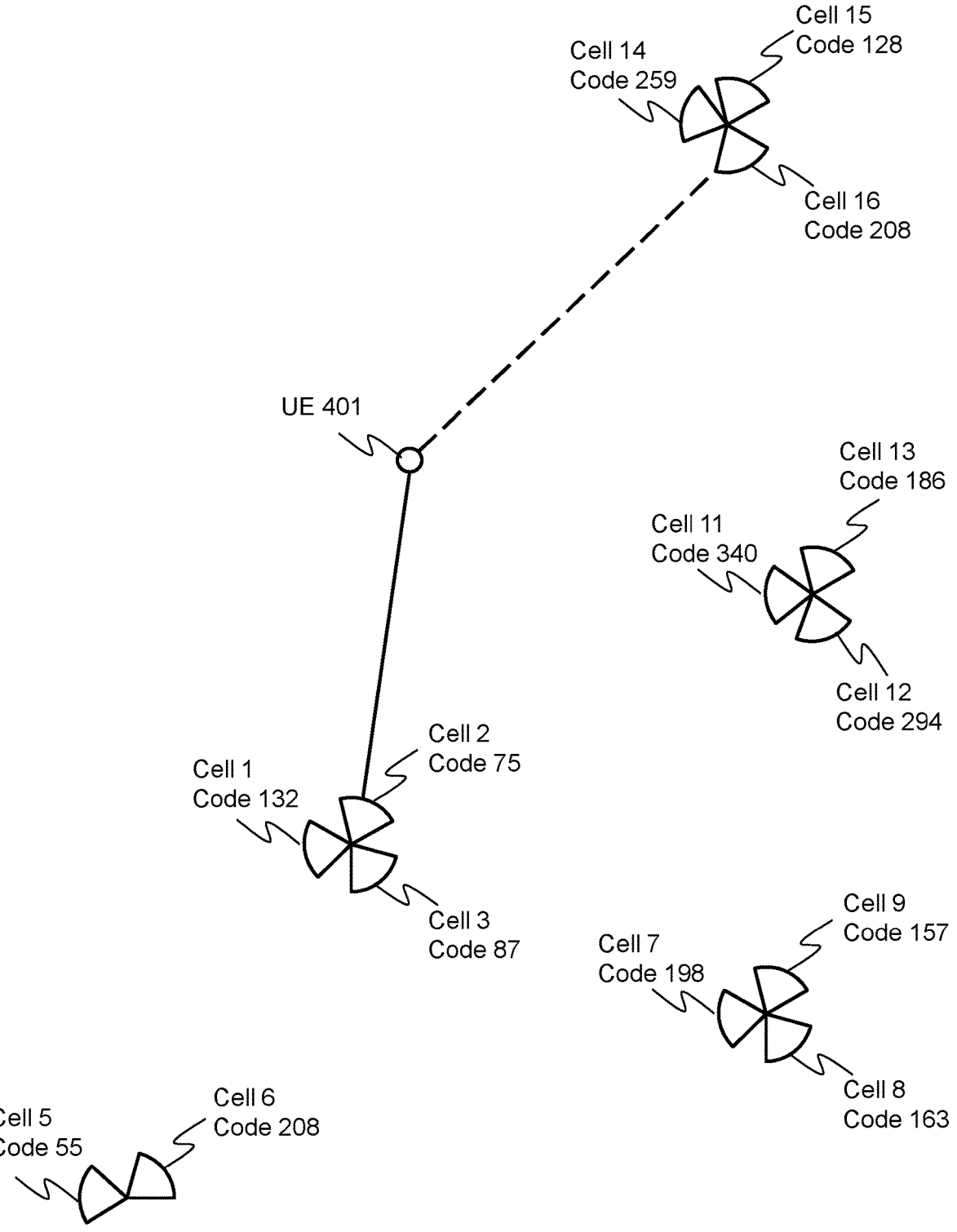
FIG. 4 illustrates an example case.

FIG. 4 illustrates an example case. FIG. 4 shows plurality of cells of base station sites and corresponding cell identifier codes and one mobile device UE 401 of a user.

There are cell 1 that uses code 132, cell 2 that uses code 75, cell 3 that uses code 87, cell 5 that uses code 55, cell 6 that uses code 208, cell 7 that uses code 198, cell 8 that uses code 163, cell 9 that uses code 157, cell 11 that uses code 340, cell 12 that uses code 294, cell 13 that uses code 186, cell 14 that uses code 259, cell 15 that uses code 128, and cell 16 that uses code 208.

The mobile device UE 401 is connected to the cell 2 that uses code 75. Neighbor list of the cell 2 includes cell 6 that uses code 208, cell 11 that uses code 340, cell 12 that uses code 294, and cell 7 that uses code 198. The mobile device UE 401 prepares a handover to another cell and as part of the handover process measures signals from cell 16 that uses code 208. Now, based on these measurements, the cell 2 may attempt to handover the mobile device UE 401 to cell 6 that uses code 208. However, in the shown example case, the distance between the mobile device UE 401 and the cell 6 is likely too long for a successful handover. In such case, various embodiments of present disclosure provide that the cell identifier code of the cell 6 is changed to a new value, e.g. 308. After this change, handover attempts are no longer made based on measurement of signals from the cell 16 as a cell with a code 208 no longer exists in the neighbor list of the cell 2.

Further, in certain cases, various embodiments of present disclosure provide that the cell 6 is removed from the neighbor list of the cell 2. Also this change results in that handover attempts are no longer made based on measurement of signals from the cell 16 as a cell with a code 208 no longer exists in the neighbor list of the cell 2.

It is to be noted that the example case of FIG. 4 is a simplified scenario provided for the purpose of illustrating certain features of example embodiments.

A technical effect achieved is that problematic cell identifier codes can be identified and systematically changed by the automatic method. In this way, network operation may be improved as it may be possible to reduce conflicting reuse of cell identifier codes and thereby the amount of handover failures may be reduced. This may improve user experience of the network service.

If desired, the different functions discussed herein may be performed in a different order and/or concurrently with each other. Furthermore, if desired, one or more of the before-described functions may be optional or may be combined.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method performed by an automation system for controlling a communications network, the method comprising:

checking whether an amount of handover failures from a first cell to a second cell exceeds a first threshold, responsive to identifying that the amount of handover failures from the first cell to the second cell exceeds the first threshold, setting a new cell identifier code for the second cell in the communications network, and preventing cell identifier code changes of the second cell for a period of time after setting the new cell identifier code for the second cell.

2. The method of claim 1, wherein the first threshold is defined as a percentage of failures over total number of handover attempts from the first cell to the second cell.

3. The method of claim 2, wherein the first threshold is 1-50%.

4. The method of claim 1, wherein the first threshold is defined as an absolute number of handover failures from the first cell to the second cell.

5. The method of claim 4, wherein the first threshold is 40-80 failures in 4 days or 7-20 failures per day.

6. The method of claim 1, wherein the first threshold is defined as a combination of a percentage of failures over total number of handover attempts from the first cell to the second cell and an absolute number of handover failures from the first cell to the second cell.

7. The method of claim 1, wherein exceeding the first threshold further requires that amount of handover attempts from the first cell to the second cell exceeds a second threshold.

8. The method of claim 7, wherein the second threshold is 40-80 handover attempts in 4 days or 7-20 handover attempts per day.

9. The method of claim 1, wherein exceeding the first threshold further requires that the first threshold is exceeded at least in two consecutive days.

10. The method of claim 1, wherein exceeding the first threshold further requires that amount of connection re-establishments and/or amount of connection drops in the first cell exceeds a third threshold.

11. The method of claim 1, wherein the cell identifier code is Scrambling Code, SC, of 3G; or Physical Cell Identifier, PCI, of 4G or 5G.

12. An apparatus comprising:

a processor, and a memory including computer program code; the memory and the computer program code configured to, with the processor, cause the apparatus to perform the method of claim 1.

13. A non-transitory computer readable medium, having stored thereon a computer program comprising computer executable program code which, when executed by a processor, causes an apparatus to perform the method claim 1.

14. The method of claim 1, wherein the method is performed by an automation system.

* * * * *